(12) United States Patent
Lindby

(10) Patent No.: US 7,083,181 B2
(45) Date of Patent: Aug. 1, 2006

(54) MOTORCYCLE ENGINE GUARD WITH RETRACTABLE FOOTRESTS

(76) Inventor: Per Lindby, 320 E. Crowther Ave., Placentia, CA (US) 92870

( * ) Notice: Subject to any disclaimer, the term of this patent is extended or adjusted under 35 U.S.C. 154(b) by 0 days.

(21) Appl. No.: 10/883,498

(22) Filed: Jul. 1, 2004

(65) Prior Publication Data

US 2005/0206125 A1    Sep. 22, 2005

Related U.S. Application Data

(63) Continuation-in-part of application No. 10/777,527, filed on Feb. 12, 2004, now Pat. No. 6,981,713.

(51) Int. Cl.
*B62J 25/00* (2006.01)
*B62J 27/00* (2006.01)

(52) U.S. Cl. ........... 280/291; 280/304.3; 74/564; 293/105

(58) Field of Classification Search .. 280/304.3–304.5, 280/291, 160.1, 284; 180/219, 90.6; 297/423.25, 297/423.26, 423.28, 423.35, 423.33; 362/475, 362/476, 523; 293/105, 116, 142; 396/75, 396/78.1; D12/114, 126; 74/564
See application file for complete search history.

(56) References Cited

U.S. PATENT DOCUMENTS

| | | | |
|---|---|---|---|
| 1,941,801 A * | 1/1934 | Harley | ................... 280/304.3 |
| D270,527 S * | 9/1983 | O'Rourke | ................... D12/114 |
| 4,771,651 A * | 9/1988 | Haro | ................... 74/564 |
| 4,852,900 A * | 8/1989 | Nahachewski | ................... 280/291 |
| D361,311 S * | 8/1995 | Lindby | ................... D12/126 |
| 5,454,580 A * | 10/1995 | Lin | ................... 280/291 |
| 6,068,075 A * | 5/2000 | Saiki | ................... 180/219 |
| 6,129,370 A * | 10/2000 | Hsieh et al. | ................... 280/291 |
| 6,142,499 A * | 11/2000 | Hsieh et al. | ................... 280/291 |
| D484,074 S | 12/2003 | Henneberry | |
| 6,688,628 B1 | 2/2004 | Burkett | |
| 6,688,629 B1 | 2/2004 | Essinger | |
| 6,719,316 B1 | 4/2004 | Anthony | |
| 6,758,484 B1 * | 7/2004 | Rice | ................... 280/304.4 |
| 2003/0090097 A1 | 5/2003 | Ranc | |
| 2005/0116443 A1 * | 6/2005 | Egan | ................... 280/291 |

* cited by examiner

*Primary Examiner*—Anne Marie Boehler
(74) *Attorney, Agent, or Firm*—Raymond Sun

(57) ABSTRACT

The invention herein described is a motorcycle guard with retractable footrests, said footrests being accessible to a driver while traveling. The guard is mounted to the frame of a motorcycle such that it transverses the cycle in front of the engine but behind the front wheel, leaving sufficient clearance to avoid inhibiting the wheel turning radius. The footrests are extended for use, and retracted when no longer needed. A mechanism is provided to prevent over-extension and over-retraction of the footrests, and a further mechanism is provided to secure the footrest while in retracted position.

13 Claims, 4 Drawing Sheets

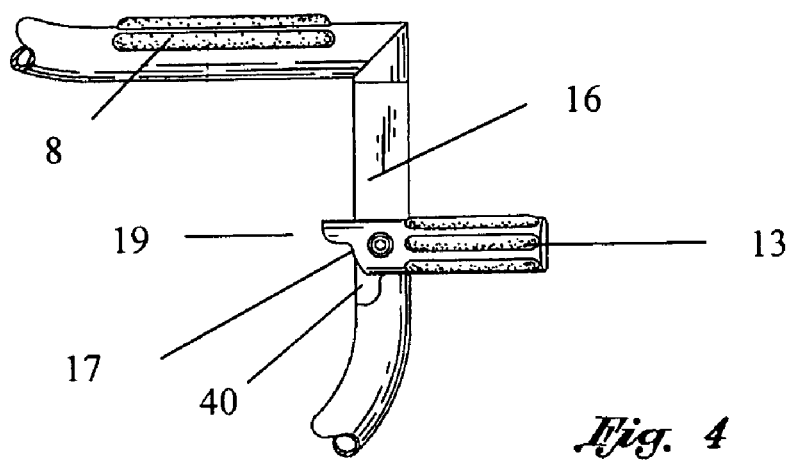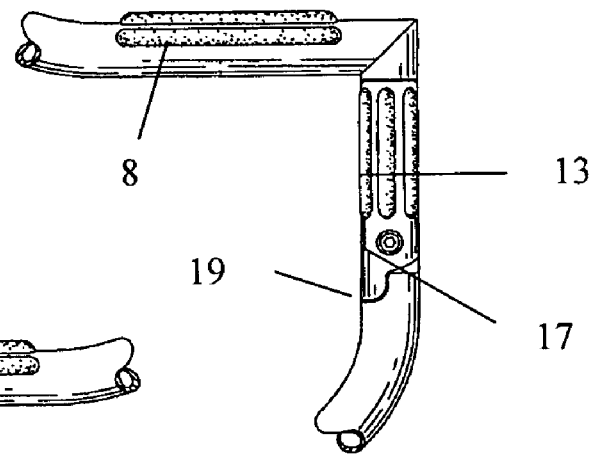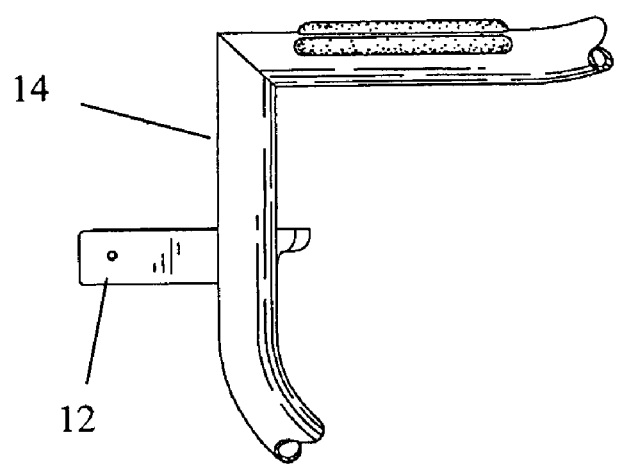

MOTORCYCLE ENGINE GUARD WITH RETRACTABLE FOOTRESTS

CROSS-REFERENCE TO PRIOR APPLICATIONS

This application is a continuation in part of regular U.S. utility patent application Ser. No. 10/777,527 filed on Feb. 12, 2004 now U.S. Pat. No. 6,981,713. It is also related to design patent application 29/193,547 filed on Nov. 11, 2003.

FIELD OF THE INVENTION

This invention relates to motorcycle accessories, and more particularly to engine guards with retractable footrests.

DESCRIPTION OF THE PRIOR ART

The engine on a motorcycle is commonly placed toward the front of the vehicle, behind the front wheel struts and forward of the seat. Motorcycle engines are typically uncovered along the sides, and therefore exposed to possible damage. Most manufacturers provide a bar or other guard to lessen the risk of damage, but such bars or guards are not attractive, are inconvenient for the placement of the rider's legs and feet, and are placed or shaped in such a way as to fail to protect adequately against damage from the side.

Some prior art teaches engine guards that combine with other functions for comfort of the operator. For example, U.S. Pat. No. 4,925,231 issued on May 15, 1990 to inventor K. Hamaguchi of Tokyo, Japan displays an engine guard that also serves as an air-conducting pipe. There remains a need for an engine guard that is attractive and yet strong so that it does not collapse or bend from the weight of a bike on its side. Such a guard must protrude out from the side of the bike by a sufficient distance as to reduce or completely eliminate side damage.

Prior art has developed many types of footrests for motorcycle operators and passengers.

These footrests have been added to various places on bikes. Some are adjustable while others are fixed. Examples include U.S. Pat. No. 6,354,723 issued on Mar. 12, 2002 to inventor W. L. Spence (describing a motorcycle footrest with a light inside); U.S. Pat. No. 6,173,983 issued on Jan. 16, 2001 to inventor T. L. Moore (displaying a set of otherwise conventional motorcycle footrests that have unusual mounting brackets); U.S. Pat. No. 4,456,090 issued on Jun. 26, 1984 to inventor F. Malenotti of Rome, Italy (adjustable motorcycle footrest); U.S. Pat. No. 4,171,823 issued on Oct. 23, 1979 to inventor S. Nemes (a motorcycle locking bar that doubles as a footrest); U.S. Pat. No. 4,030,561 issued on Jun. 21, 1977 to inventors Hashimoto and Shako (a motorcycle footrest that pivots); U.S. 2002/0158441 is a published patent application of inventor M. Esssinger, published on Oct. 31, 2002 (a dual eccentric adjustable motorcycle footrest); German patent DE 19,511,760 to inventor K. Vosteen (an adjustable cantilevered footrest useable by a passenger on a motorcycle).

The difficulty with the prior art is that it requires additional parts and accessories to be added to a motorcycle. Most cycle operators would prefer to have several footrests available so they can change leg positions for comfort during their ride. However, the more parts that are added to a cycle, the more weight the cycle must carry with some resulting decrease in performance, plus more parts means there will be additional deterioration and breakage.

There is thus a need for motorcycle accessories that can serve a dual purpose as a footrest for the operator while serving in their primary function.

SUMMARY OF THE PRESENT INVENTION

The present invention provides a strong engine guard of forged steel that protrudes from the side of a motorcycle immediately in front of the engine and behind the front wheel strut. This guard is designed not to bend or collapse under normal forces encountered in motorcycle operation, to transverse the motorcycle in front of the engine but without inhibiting front wheel movement, and to protect the motorcycle engine from side damage. In addition, the present invention is specially designed to serve as a footrest for the operator in two places, one of which is moveable. Friction strips are imbedded or attached to the guard on either side in the protruding area most convenient for the operator's feet placement. A retractable foot peg is provided on each side leg of the guard, which pegs are flattened on the side facing the driver and may be pivotable from the engine guard such that the operator has the option of extending the pegs or folding them into the guard. The shape of the engine guard has been specially designed to be attractive to the operator, and the engine guard is chrome-coated. While the basic shape of the engine guard remains the same, the size of the guard and the angles of the vertical legs may be adjusted to fit different models and makes of motorcycles.

An object of the present invention is to provide an engine guard for a motorcycle.

Another object of the present invention is to provide an engine guard that is strong enough to resist bending or collapsing under the weight of the motorcycle in a slip or fall, or in an accident.

Still another object of the present invention is to provide an engine guard that will help protect the motorcycle engine and body from scratches and dents when the motorcycle is laid on its side.

Yet another object of the present invention is to provide an embodiment of the invention that will enhance the visual appearance of the motorcycle.

A further object of the present invention is to provide a plurality of footrests in different locations for the comfort of the operator.

A further object of the present invention is to provide footrests that can be extended with ease by the operator, even while the motorcycle is in motion, and that can be closed up to the bar of the engine guard when the footrests are not in use, thereby retaining the integrity of the shape of the bar and keeping it attractive to operators and onlookers.

Still another object of the present invention is to provide footrests that are optimally placed for most efficient use and best appearance of the motorcycle.

These and other objects of the present invention will become evident and clarified by the following description and appended claims and drawings.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 3 shows a sectional detail of the right side of the present invention, with retractable footrest in extended position.

FIG. 4 shows a sectional detail of the right side of the present invention, with retractable footrest retracted, in stowed position.

FIG. 5 shows a sectional detail of the right side of the present invention from the side opposite of the motorcycle operator, with retractable footrest in extended position.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as representative basis for teaching one skilled in the art to employ the present invention in virtually any appropriately detailed system, structure, or manner. The drawings constitute a part of this specification and include exemplary embodiments to the invention, which may be embodied in various forms. It is to be understood that in some instances various aspects of the invention may be shown exaggerated or enlarged to facilitate an understanding of the invention.

Figure 1:
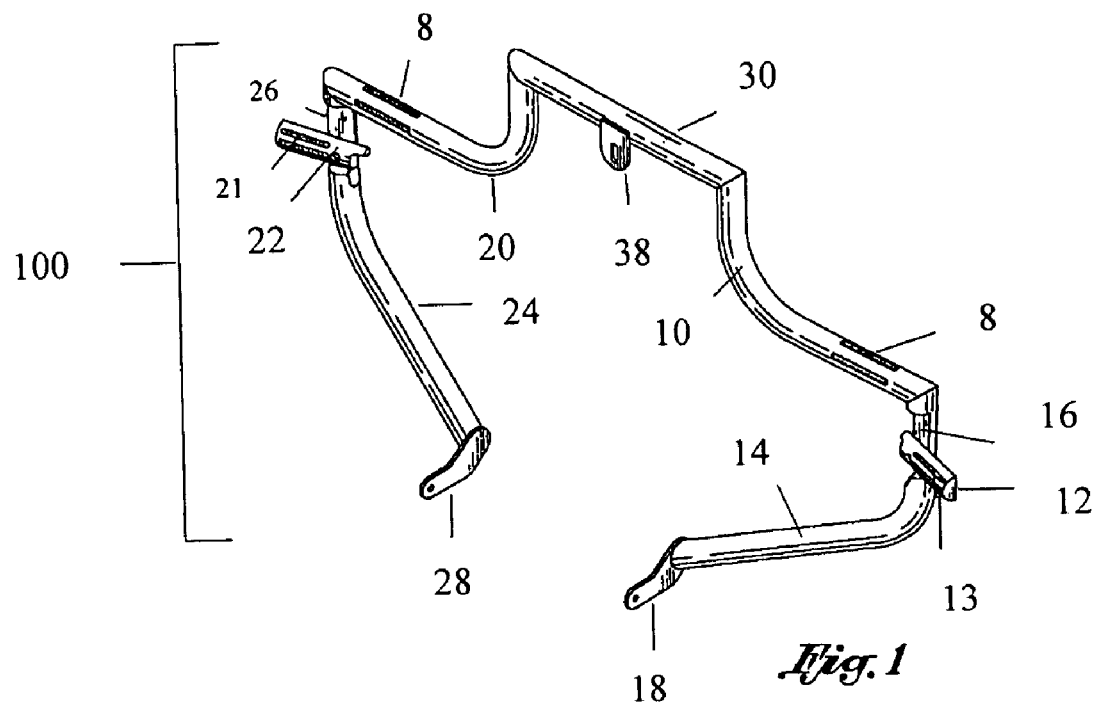
FIG. 1 displays a preferred embodiment of the present invention, dismounted from a motorcycle, in a perspective view from above and to the side.

FIG. 1 displays a preferred embodiment of the present invention, dismounted from a motorcycle, in a perspective view from above and to the side. The guard 100 is comprised of sections of a steel tubular pipes welded together to form one integral bar and chrome-plated. The bar has a horizontal center pipe piece 30 that is attached by welding to a curved pipe piece 10 on the right side and a similarly curved pipe piece 20 on the left side. These pieces are welded to be planar with the horizontal center piece and with the curves extended in opposite directions to the right and left. The shapes of the horizontal and curved pipe pieces are specifically designed to transverse a motorcycle in front of the engine and behind the front wheel struts, leaving sufficient clearance to avoid inhibiting the turning radius of the front wheel.

On each curved piece, strips 8 have been machined into the pipe and filled with a friction-creating material, such as rubber. This creates a footrest on the outer end of each curved piece of the engine guard at the area where the guard will protrude from the side of the bike when mounted on it.

To each of the first curved pieces on opposing sides 10, 20, two other curved pieces 14, 24 are welded in a vertical position, with the lower curved sections facing inwards towards each other and angled slightly toward the rear. When mounted, these second curved sections extend toward the motorcycle and are attached by a left bracket 18 and right bracket 28 to the bike frame near the lower part of the engine. The curve and angle of the lower sections may be varied to be adapted to different models and makes of motorcycles. The engine guard is additionally secured to the motorcycle frame at a point near the top of the engine by a bracket 38 welded to the horizontal centerpiece of the guard.

On the left side pipe piece 14 and the right side pipe piece 24, right and left retractable footrests 12, 22 are provided, each of which can be pivoted up to a 90-degree angle from the bar. The footrests retract into cutout areas 16, 26 on the right and left side pipes, respectively. These footrests are further described in detail in FIGS. 2 through 5.

Figure 2:
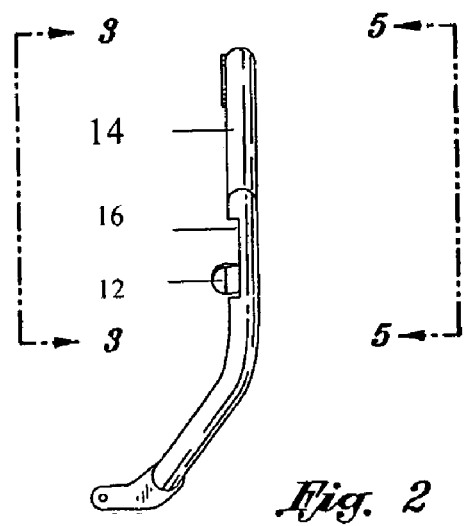
FIG. 2 shows a preferred embodiment of the present invention from a side view of the right side, with retractable footrest extended.

FIG. 2 shows a sectional detail of the right side 14 of the present invention, with retractable footrest 12 extended, as viewed from the side. From this view, it can be seen that the lower portion of the vertical pipe is not planar with the upper section, but rather bends slightly toward the left, ending in a bracket 18 for mounting to the bike frame. When the guard is mounted on the motorcycle, this leftward bend would be toward the operator and toward the rear of the bike. The left side on the opposite of the motorcycle would bend the same degree toward the right, again bending toward the operator and the rear of the bike. This bend allows the guard to be attached by means of the bracket 18, 28 (the left bracket being shown in FIG. 1) to the motorcycle frame near the lower part of the engine, but then the sides and horizontal sections of the pipe can extend forward of the engine into the open space between the engine and the front wheel strut.

In FIG. 2, the retractable footrest 12 is extended at 90 degrees from the side pipe 14. It can be seen that the footrest 12 is shaped in the form of a half circle, with a flat edge and a semicircular edge. The left side footrest 22 (shown in FIG. 1) has the same shape. This shape allows the right footrest to fit snugly within the cutout area 16. The same is the case for the left footrest, which will fit snugly within the left-side corresponding cutout area 26 (shown in FIG. 1).

The retractable footrests 12, 22 essentially comprise sections of tubular pipe that have been sliced horizontally in half, then cut out from the main section of pipe, and filled in to form a flat surface on the cut face. The cutout areas of the side pipe 16, 26 are filled in the same manner to form flat surfaces. Thus, when said footrests 12, 22 are retracted, they are pivoted 90 degrees to align with the side section of the pipe. Except for seams, the resulting pipe looks essentially as if no footrests were attached.

FIG. 3 shows a sectional detail of the right side of the present invention, with retractable footrest in extended position. Correspondingly, FIG. 4 shows a sectional detail of the right side pipe of the present invention, with the retractable footrest retracted, in stowed position, from the same perspective view as in FIG. 3. This demonstrates the snug fit described above. The retractable footrest is attached to the right side pipe by means of an inset pivot pin 17.

In both FIGS. 3 and 4, footrest strips 8 have been machined into the horizontal pipe piece and filled with a friction-creating material, such as rubber. Similar footrest strips are machined into the horizontal left side pipe of the bar 8 (shown in FIG. 1). Footrest strips 13, 21 are also machined into both the right and left retractable footrests 12, 22 (the left footrest and footrest strips being shown in FIG. 1). Because the footrests can be extended and retracted, these footrest strips provide two additional locations for placement of the operator's feet while traveling, one while the footrest is retracted, and one on the extended footrest.

In FIG. 3, it can be seen that the base of the footrest has a curvilinear shape and the cut-out area 16 of the side pipe has a corresponding shape. This curvilinear shape creates an extension 19 of approximately one-half of the width of the footrest at the base of the footrest. In FIG. 4, it can be seen that this extension 19 closes into the corresponding shape of the cut-out area 16 and thereby stops the traverse of the footrest when being retracted at the point when the footrest is fully retracted. FIG. 3 demonstrates how, when the footrest is extended, it comes to a stop when the side of the footrest meets the side of the cut-away area 16 in the side bar, preventing the footrest from over-traversing beyond the desired 90-degree extended position shown in FIG. 3. The same arrangement is made for the left footrest.

FIG. 3 also shows a small circular recessed depression 50 that is made in the cut-away area 16. This recessed depression is part of one embodiment of a locking mechanism, which is further described in FIG. 7.

Referring to FIG. 5, the right side 14 of the present invention is shown in sectional detail from the side opposite the motorcycle operator when the bar is mounted on the bike. The retractable footrest 12 is shown extended at a 90-degree angle from the bar. In this view, it can be seen that a small peg is inserted near the upper end of the retractable footrest 51. This peg corresponds with the recessed depression 50 shown in FIG. 3, together being one embodiment of a locking mechanism as further described in FIG. 7.

Figure 6:
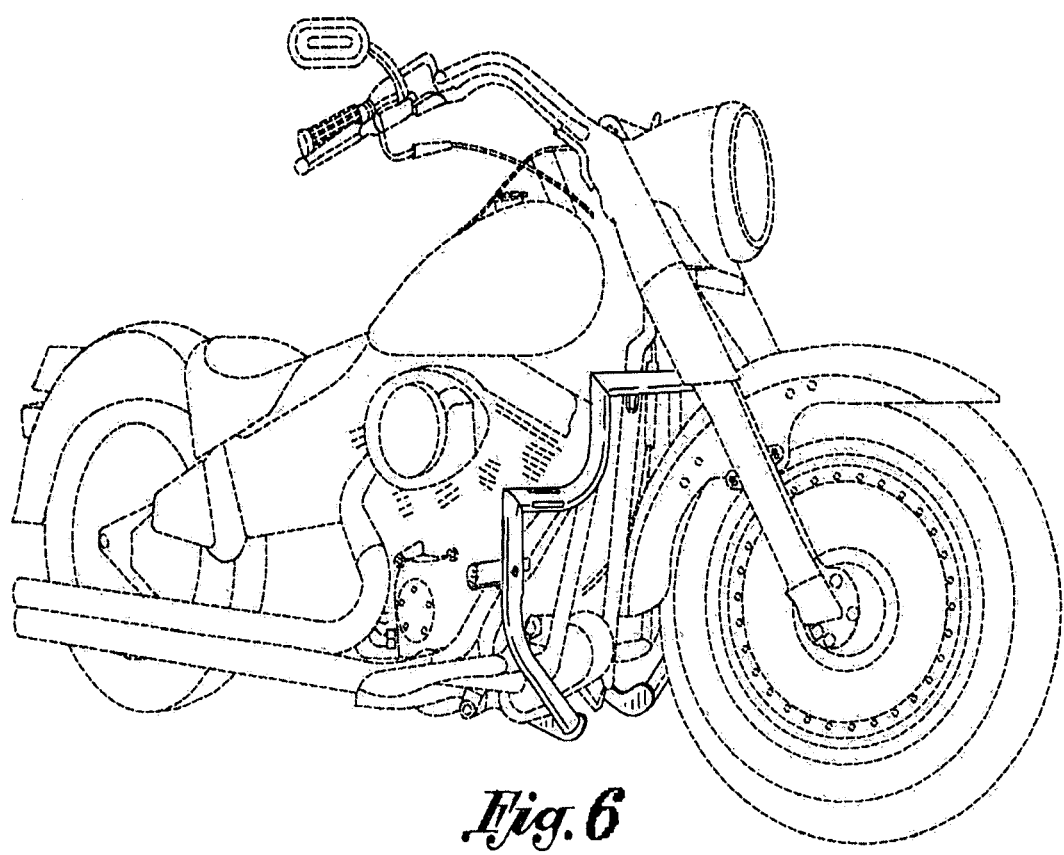
FIG. 6 shows a perspective view of a preferred embodiment of the present invention as attached to the frame of a motorcycle. The motorcycle itself is not part of the current invention, and is therefore illustrated in broken lines.

FIG. 6 shows a perspective view of a preferred embodiment of the present invention 100 as attached to a motorcycle. The motorcycle itself is not part of the current invention, and is therefore illustrated in broken lines. Only one side of the present invention 100 is visible in this perspective view because the invention is attached so that it crosses from one side of the motorcycle to the other immediately in front of the engine but behind the front-wheel struts. This view also demonstrates the significance of the position and shape of the bar for purposes of providing adequate clearance for the turning radius of the front wheel while also providing secure attachment 18 to the frame of the bike. The present invention will extend out from each side of the motorcycle approximately 6 to 12 inches, and the retractable footrest 12 can be further extended to a 90-degree angle from the side pipe of the engine guard by another four to six inches. The retractable footrest 12 is shown at full extension.

It will be noted that experience has shown that the position of the footrests is critical for optimal performance. As shown in the attached drawings, the preferred position is partway down the opposing side pipes of the guard, on the side facing toward the rear of the motorcycle and toward the motorcycle operator. This enables easy operation of the footrests to extended and retracted positions with minimal effort and distraction on the part of the operator, even while driving the bike.

An important feature of the retractable footrests is the locking feature, the purpose of which is to prevent the closed retractable footrests from accidentally deploying. One embodiment of this feature combines a spring-action locking pin 51 with a slightly recessed depression 50, as shown in FIGS. 3 and 5. When the footrest is retracted, the locking pin 51 extends into the slightly recessed depression 50, thus preventing the footrest from accidentally deploying. Only a slight depression is required to secure the footrest in the closed position, and therefore the footrest is extendable by exertion of only a slight force against the side of the footrest when the motorcycle operator desires to move the footrest to extended position.

Figure 7:
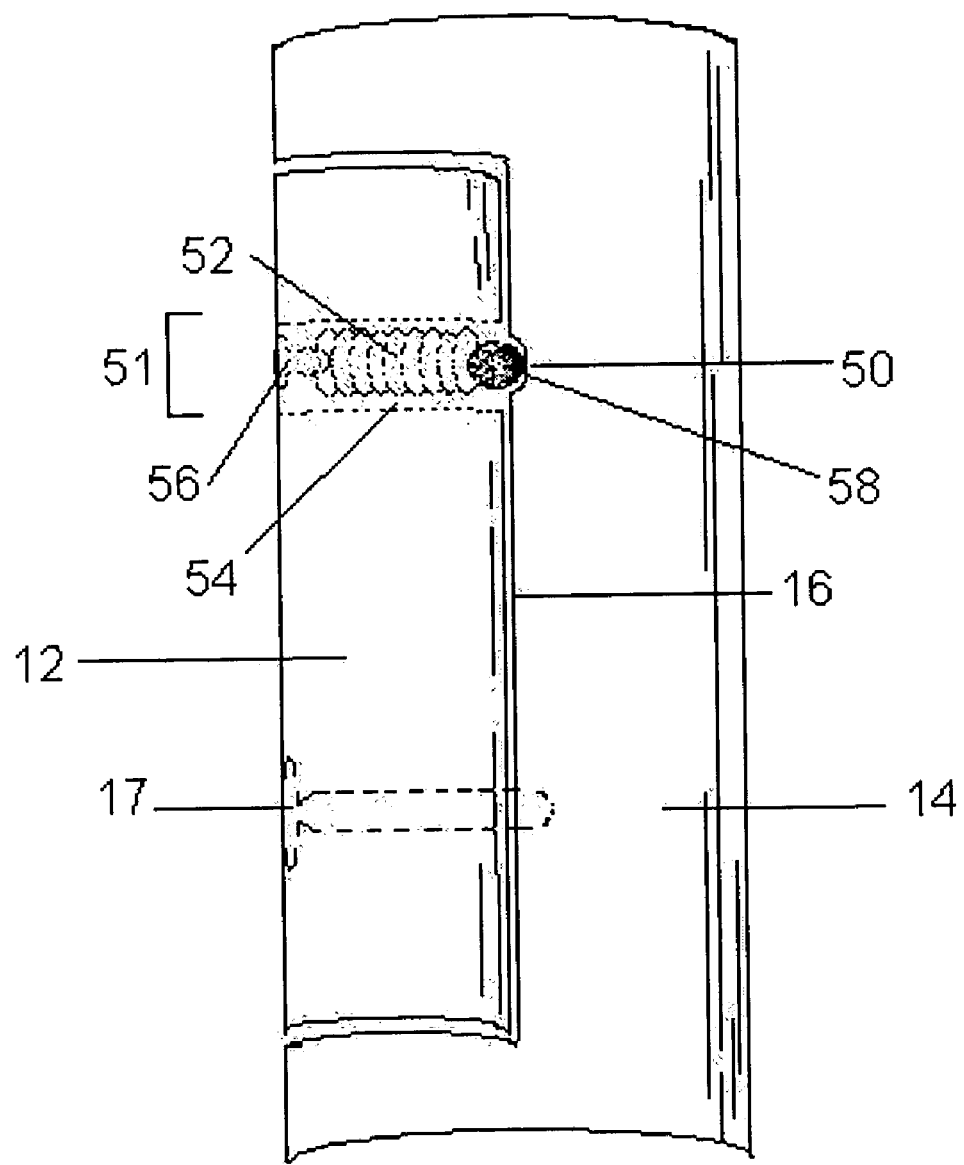
FIG. 7 shows a cutaway view of the side of the present invention, illustrating one embodiment of a spring-action pin for securing and maintaining the retractable footrest in closed position.

FIG. 7 shows the spring-action pin in detail from a side cut-away view of the right side pipe and the right retractable footrest 12, attached to said pipe by means of a pivot pin 17. The spring 52 is inserted into a shaft 54 cut into through the retractable footrest 12. The spring is held in place in the shaft by attaching it to the semicircular edge of the retractable footrest, such as by means of a screw 56. At the opposite end of the spring, a small ball 58 is welded or otherwise attached to the spring in such a position that approximately one-half of the ball protrudes from the shaft 54 when the spring 52 is fully extended. The retractable footrest can then be moved into closed position, allowing the ball 58 to meet up against the flat area of the side pipe of the bar 16 and to be pushed inside the shaft 54, recoiling the spring 52. As the retractable footrest comes to an upright position, the ball comes into correspondence with the recessed depression 50 in the flat area 16 of the side pipe of the bar and the recoiled spring 52 can be released, causing the ball 58 to protrude from the flat edge of the retractable footrest 12 and into the recessed depression 50 in the flat area 16 of the side pipe of the bar 14. The use of a ball facilitates this action because the curved sides allow the ball to slide into the shaft when pushed against the flat surface of the bar with minimal force. A similar arrangement is provided for the left retractable footrest.

While the invention has been described in connection with a preferred embodiment or embodiments, it is not intended to limit the scope of the invention to the particular form set forth, but on the contrary, it is intended to cover such alternatives, modifications, and equivalents as may be included within the spirit and scope of the invention as defined by the appended claims.

I claim:

1. A motorcycle engine guard, comprising:
   a bar having a sufficient length to surround the engine of a motorcycle, the bar having a first side that extends from the bottom of the engine on one side of the engine to the top of the engine, and a second side that extends from the bottom of an opposite side of the engine to the top of the engine, the first side of the bar having a vertical section;
   a footrest pivotably coupled to the vertical section of the first side of the bar, the footrest having an extension that engages a portion of the vertical section of the first side of the bar to limit the pivoting motion of the footrest;
   a cut-out region formed in the vertical section of the first side of the bar; and
   wherein the footrest is pivotably coupled to the cut-out region, with the extension of the footrest engaging the cut-out region to limit the pivoting motion of the footrest.

2. The guard of claim 1, wherein the bar is shaped as an inverted U, with a flattened top.

3. The guard of claim 1, wherein the footrest is fitted inside the cut-out region when the footrest is not in use.

4. The guard of claim 3, wherein the footrest is aligned with the remainder of the first side of the bar when the footrest is fitted inside the cut-out region.

5. The guard of claim 1, wherein the footrest has a semicircular cross-section with a flat edge and a semicircular edge.

6. The guard of claim 1, further including a pin that pivotably couples the footrest to the first side of the bar.

7. The guard of claim 1, wherein the cut-out region is a first cut-out region, and the footrest is a first footrest, the guard further including:
   a second cut-out region formed in the second side of the bar; and
   a second footrest pivotably coupled to the second cut-out region.

8. A motorcycle engine guard, comprising:
a bar having a sufficient length to surround the engine of a motorcycle, the bar having a first side that extends from the bottom of the engine on one side of the engine to the top of the engine, and a second side that extends from the bottom of an opposite side of the engine to the top of the engine, the first side of the bar having a vertical section;
a footrest pivotably coupled to the vertical section of the first side of the bar;
a depression provided in the vertical section of the first side of the bar;
a locking pin coupled to the footrest and extending into the depression to lock the footrest to the vertical section of the first side of the bar;
a cut-out region formed in the vertical section of the first side of the bar; and
wherein the footrest is pivotably coupled to the cut-out region.

9. The guard of claim 8, further including means for limiting the pivoting motion of the footrest.

10. The guard of claim 8, further including a pin that pivotably couples the footrest to the first side of the bar.

11. The guard of claim 8, wherein the bar is shaped as an inverted U, with a flattened top.

12. The guard of claim 8, wherein the cut-out region is a first cut-out region, and the footrest is a first footrest, the guard further including:
a second cut-out region formed in the second side of the bar; and
a second footrest pivotably coupled to the second cut-out region.

13. The guard of claim 8, wherein the footrest is fitted inside the cut-out region when the footrest is not in use.

\* \* \* \* \*